United States Patent
Edwards et al.

(10) Patent No.: US 10,137,810 B2
(45) Date of Patent: Nov. 27, 2018

(54) VEHICLE SEATING SYSTEM AND METHOD FOR MANUFACTURING

(71) Applicant: LEAR CORPORATION, Southfield, MI (US)

(72) Inventors: Chris J. Edwards, Burton-on-Trent (GB); Steven J. Cooper, Droitwich (GB); Raymond Arthur Lloyd, Lichfield (GB)

(73) Assignee: Lear Corporation, Southfield, MI (US)

( * ) Notice: Subject to any disclaimer, the term of this patent is extended or adjusted under 35 U.S.C. 154(b) by 221 days.

(21) Appl. No.: 15/076,922

(22) Filed: Mar. 22, 2016

(65) Prior Publication Data

US 2017/0274805 A1     Sep. 28, 2017

(51) Int. Cl.
*B60N 2/64*     (2006.01)
*B60N 2/70*     (2006.01)

(52) U.S. Cl.
CPC ............... *B60N 2/646* (2013.01); *B60N 2/70* (2013.01)

(58) Field of Classification Search
CPC ............. A47C 7/20; B60N 2/646; B60N 2/70
USPC ........................................ 297/452.57, 452.55
See application file for complete search history.

(56) References Cited

U.S. PATENT DOCUMENTS

| | | | | |
|---|---|---|---|---|
| 2,833,340 A * | 5/1958 | Shapiro | ..................... | A47C 7/20 267/145 |
| 3,967,852 A * | 7/1976 | Eiselt | ..................... | A47C 5/125 297/452.49 |
| 4,265,484 A * | 5/1981 | Stalter | ..................... | A47C 7/20 267/142 |
| 5,400,490 A | 3/1995 | Burchi | | |
| 5,762,842 A | 6/1998 | Burchi et al. | | |
| 6,213,553 B1 | 4/2001 | Fitz | | |
| 8,172,318 B2 | 5/2012 | Kruger et al. | | |
| 9,914,382 B2 * | 3/2018 | De Nichilo | .............. | B60N 2/72 |
| 2014/0084663 A1 | 3/2014 | Todd | | |
| 2014/0306504 A1 | 10/2014 | Boy et al. | | |

FOREIGN PATENT DOCUMENTS

DE     10 2008 046 473 A1     3/2010

OTHER PUBLICATIONS

CAD drawing of seat wedge used prior to Mar. 22, 2016.

\* cited by examiner

*Primary Examiner* — Milton Nelson, Jr.
(74) *Attorney, Agent, or Firm* — Brooks Kushman P.C.

(57) ABSTRACT

A seating system for a vehicle has a positioning insert configured for attachment at a predetermined location to a portion of a seat cushion arrangement forming a part of the seating system such that the positioning insert facilitates positioning a seated occupant at a desired fore-aft position. The positioning insert may include a first side having a generally arcuate portion configured to be oriented toward a seated occupant and to receive a seated occupant's buttocks to facilitate positioning of the seated occupant at the desired fore-aft position.

17 Claims, 3 Drawing Sheets

VEHICLE SEATING SYSTEM AND METHOD FOR MANUFACTURING

TECHNICAL FIELD

The present disclosure relates to a vehicle seating system and a method for manufacturing such a system.

BACKGROUND

Correct positioning of a seated occupant in a vehicle may be an important design consideration. One design parameter that may be used to determine occupant positioning is the "H-point". For purposes of vehicle design, the H-point may be the hip point of a seated crash test dummy. Seat designers can modify various design parameters—for example, the geometry of a seating system and its location within the vehicle—to adjust the position of the H-point. In many vehicles, it is desirable to have a seating system that accommodates three passengers in the same row. If the vehicle package is relatively small, however, this design consideration may be difficult to implement. If it were possible to move one of the occupants somewhat forward, then adequate room may be available for all three occupants, even in the case of a small vehicle package. It would therefore be desirable to have a seating system and a method for manufacturing such a seating system that would facilitate locating a seated occupant in a desired position to overcome at least some of the aforementioned issues.

SUMMARY

At least some embodiments of the present invention may include a seating system for a vehicle having a seat cushion arrangement including a seat cushion having a seating surface. A positioning insert may be disposed below the seating surface of the seat cushion and have a first side oriented generally upward toward the seating surface of the seat cushion, and a second side oriented generally downward away from the seating surface of the seat cushion. The first side may include a back portion, a front portion, and a middle portion disposed between the front portion and the back portion. The middle portion may be positioned lower than the front portion and the back portion such that the back portion inhibits rearward movement of a seated occupant beyond the back portion, and the front portion inhibits forward movement of a seated occupant. The positioning insert may be located in the seat cushion such that it facilitates positioning of a seated occupant at a desired fore-aft position.

At least some embodiments of the present invention may include a seating system for a vehicle having a positioning insert configured for attachment at a predetermined location to a portion of a seat cushion arrangement forming a part of the seating system such that the positioning insert facilitates positioning a seated occupant at a desired fore-aft position. The positioning insert may include a first side having a generally arcuate portion configured to be oriented toward a seated occupant and to receive a seated occupant's buttocks to facilitate positioning of a seated occupant at the desired fore-aft position.

At least some embodiments of the present invention may include a method of manufacturing a seating system for a vehicle that includes the step of attaching a positioning insert to a wireframe of a seat cushion arrangement. The positioning insert may include a first side having a generally arcuate portion configured to be oriented toward a seated occupant and to receive a seated occupant's buttocks. The positioning insert may be attached to the wireframe such that a seated occupant will be positioned at a desired fore-aft position. A foam material may be molded over the wireframe of the seat cushion arrangement and the positioning insert to form a portion of a seat cushion.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
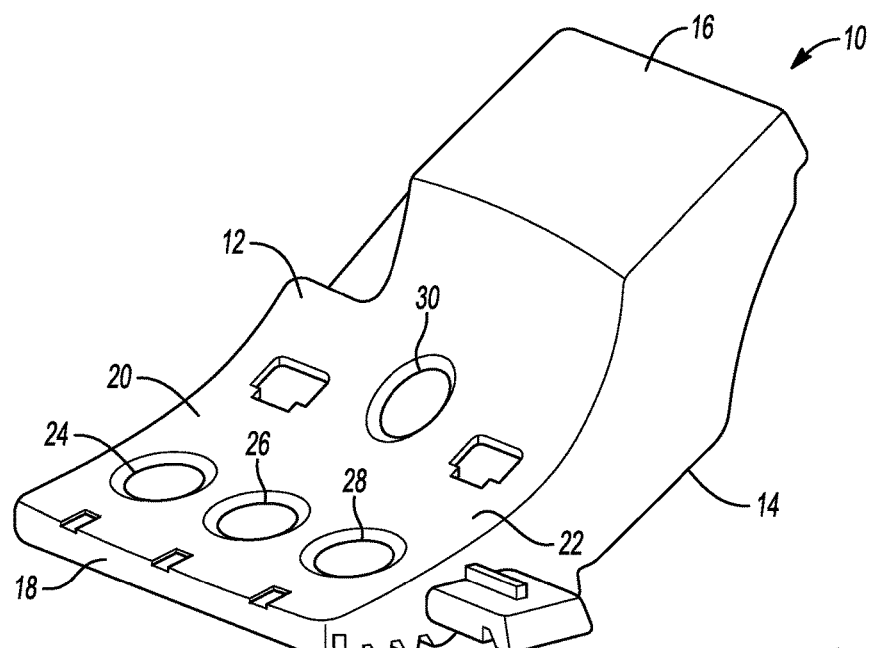
FIG. 1 shows a perspective view of a positioning insert in accordance with embodiments of the present invention.

FIG. 1 shows a positioning insert 10 in accordance with embodiments of the present invention. The positioning insert 10 is configured for attachment at a predetermined location to a portion of a seat cushion arrangement forming a part of a seating system, which is illustrated in the drawing figures and described in more detail below. The positioning insert 10 includes a first side 12, which, when installed in a seating system, will be oriented generally upward toward a seating surface of the seat cushion. A second side 14 is oriented generally downward away from the seating surface of the seat cushion when it is installed in the seating system. The first side 12 includes a back portion 16, a front portion 18, and a middle portion 20 disposed between the front portion and the back portion. The first side 12 also includes a generally arcuate portion 22 configured to be oriented toward a seated occupant and to receive a seated occupant's buttocks to facilitate positioning of a seated occupant at a desired fore-aft position.

Figure 2:
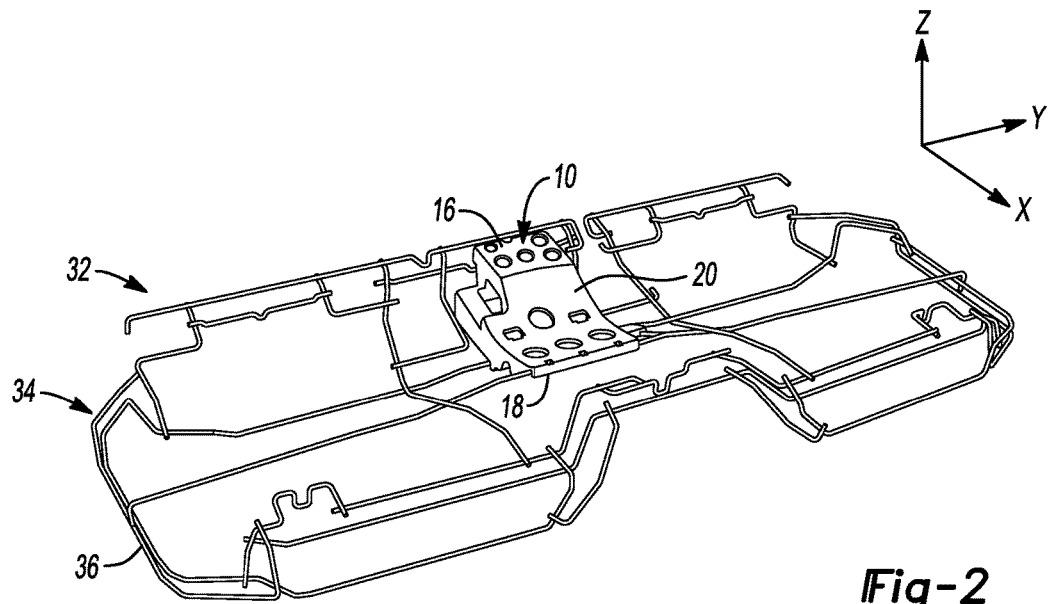
FIG. 2 shows a perspective view of the positioning insert shown in FIG. 1 attached to a wireframe of a seat arrangement.

The positioning insert 10 also includes a plurality of apertures 24, 26, 28, 30, which, as explained in more detail below, facilitate in situ molding of the positioning insert 10 into, for example, a foam seat cushion. FIG. 2 shows the positioning insert 10 forming a part of a seating system 32 for a vehicle in accordance with embodiments of the present invention. The seating system 32 also includes a seat cushion arrangement 34 having a wireframe 36 to which the positioning insert 10 is attached. An x-y-z coordinate system is shown in FIG. 2 in accordance with a convention frequently used in a vehicle seat design, where the y-axis is across a width of the seat, the x-axis is in a fore-aft direction, and a z-axis is vertically oriented. As shown in FIG. 2, the middle portion 20 of the positioning insert 10 is positioned lower than the front portion 18 and the back portion 16. In this way, the back portion 16 inhibits rearward movement of a seated occupant beyond the back portion 16, and the front portion 18 inhibits forward movement of a seated occupant. This is further illustrated and described in conjunction with FIGS. 4 and 5.

Figure 3:
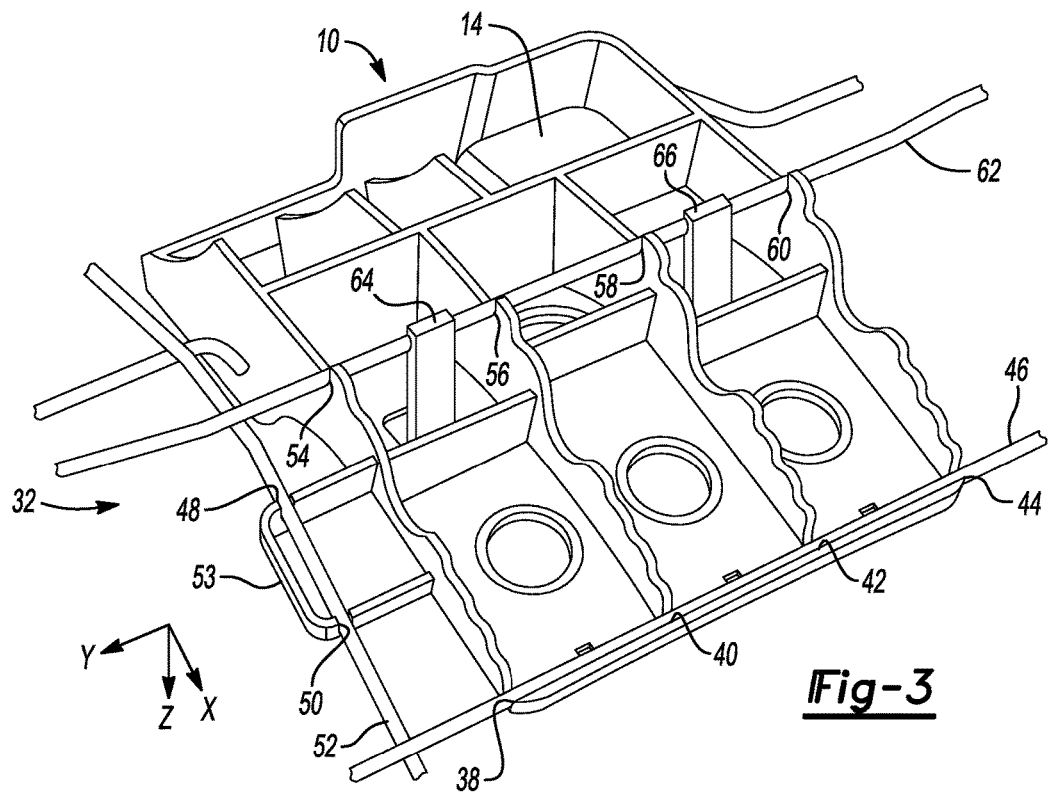
FIG. 3 shows a bottom-side perspective view of the positioning insert and a portion of the wireframe shown in FIG. 2.

FIG. 3 shows the second side 14 of the positioning insert 10 and how it is attached to the wireframe 32. The second side 14 of the positioning insert 10 includes a plurality of attachment features, and in particular, several attachment features 38, 40, 42, 44, which in the embodiment shown in FIG. 3 are configured as slots for receiving a first wireframe element 46 making up a portion of the wireframe 32. The second side 14 of the positioning insert 10 also includes additional attachment features 48, 50, which are also configured as slots to receive a second wireframe element 52 making up a portion of the wireframe 32. As shown in FIG. 3, the first wireframe element 46 is oriented generally along the y-axis, while the second wireframe element 52 is oriented generally along the x-axis. Thus, in the embodiment illustrated in FIG. 3, the first and second wireframe elements 46, 52 are oriented substantially perpendicular to each other.

Having two different sets of attachment features, such as shown in the embodiment illustrated in FIG. 3, and in particular attachment features which attached to the elements oriented in different directions, helps to ensure that the positioning insert 10 will remain in a desired location throughout a molding process of the seat cushion. Because the attachment features 38, 40, 42, 44 could allow the positioning insert 10 to translate along the y-axis, the attachment features 48, 50 are disposed on a lateral extension 53, which may be conveniently referred to as a y-locator. The second side 14 of the positioning insert further includes additional attachment features 54, 56, 58, 60, which are also configured essentially as slots for receiving another wireframe member 62 forming a part of the wireframe 32. Cooperating with the attachment features 54, 56, 58, 60 are tabs 64, 66, which also capture a portion of the wireframe element 62.

One of the advantages of having a configuration for attaching the positioning insert 10 as illustrated in FIG. 3 is that it allows the positioning insert 10 to be connected to the wireframe 32 by using only a vertically downward movement of the positioning insert 10 relative to the wireframe 32. As explained in more detail below, the attachment features described above function at least in part to hold the positioning insert 10 in a desired location while seat foam is molded around the wire frame 32 and the positioning insert 10. After the foam is molded, it is the foam that primarily holds the positioning insert 10 in place. Therefore, in this embodiment there is no need for the attachment features of the second side 14 of the positioning insert 10 to be configured as hooks or to otherwise surround the wireframe elements of the wire frame 32. Having attachment features configured as slots and tabs as illustrated in the embodiment shown in FIG. 3 facilitates fast and efficient installation of the positioning insert 10 onto the wireframe 32 by requiring only a single directional movement—i.e., downward—rather than trying to capture the wireframe inside hook elements or by using multiple-piece attachment features.

Figure 4:
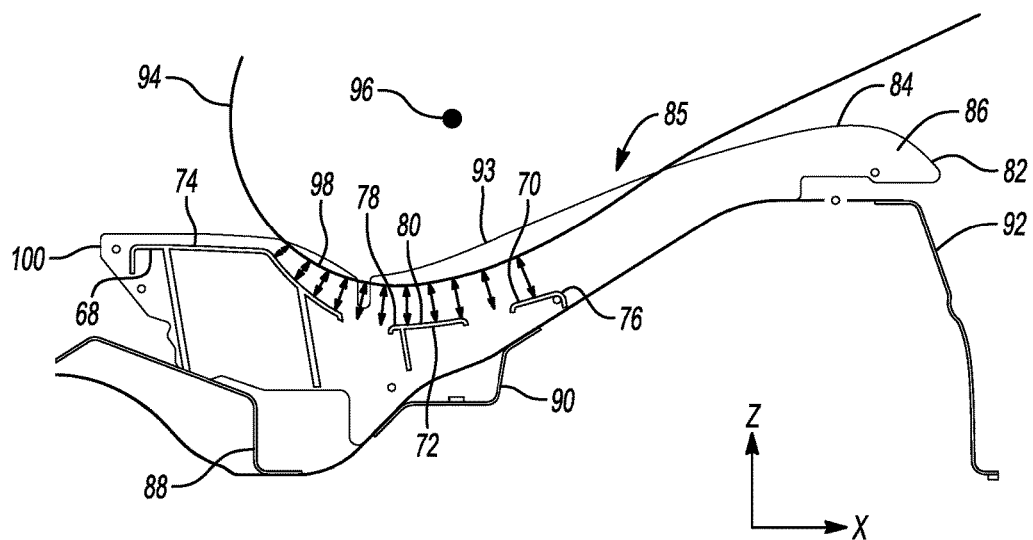
FIG. 4 shows a side-sectional view of a positioning insert in accordance with embodiments of the present invention embedded in a seat cushion foam.

FIG. 4 shows a positioning insert 68 having features a similar to those illustrated and described above with regard to the positioning insert 10. For example, the positioning insert 68 includes a first side 70 and the second side 72 disposed opposite the first side 70. The first side 70 includes a back portion 74, a front portion 76 and a middle portion 78. The first side 70 also includes a generally arcuate portion 80, which is configured to be curved upward toward a front 82 of a seat cushion 84 forming a part of seat cushion arrangement 85. FIG. 4 shows the positioning insert 68 surrounded by foam material 86 of the seat cushion 84. In the embodiment shown in FIG. 4, the foam 86 has been "overmolded" over the positioning insert 68.

Also shown in FIG. 4, the seat cushion 84 is supported by frame structures 88, 90, 92, which may be part of a seat frame or a vehicle body into which the seat is installed. The seat cushion 84 includes a seating surface 93, which may be, for example, a cloth or leather trim material disposed on the outside of the foam 86. As shown in FIG. 4, the positioning insert 68 is disposed below the seating surface 93 of the seat cushion 84. The first side 70 of the positioning insert 68 is oriented generally upward toward the seating surface 93, and the second side 72 is oriented generally downward away from the seating surface 93.

FIG. 4 also shows a partial contour of a seated occupant 94, which in this embodiment is a mannequin or test dummy. A single black dot 96 represents the "H-point" of the occupant 94. This is the hinge-point of the occupant's hip, and is used in seating design to locate a seated occupant in a desired position. In the embodiment shown in FIG. 4, the generally arcuate portion 80 of the positioning insert 68 is configured to receive the buttocks 98 of the seated occupant 94 in such a way that seated occupant 94 is positioned in a desired fore-aft position, which in the orientation shown in FIG. 4 is along the x-axis. As described above, a determination of the proper H-point may be dictated at least in part by a desire to move the seated occupant somewhat forward so that the seating system can comfortably accommodate three passengers in the same row. Although it may be possible to move a passenger forward by designing a convex portion into the seat back, such a design may make it very difficult to fold the seat back downward so that it lies horizontally. Therefore, a positioning insert, such as the positioning insert 68 may achieve the desired goal without creating problems for a fold-down function of the seat.

Although the foam material 86 remains disposed between the seated occupant 94 and the first side 70 of the positioning insert 68, the foam 86 is generally conformal—e.g., it may be made from a polyurethane or other foam material effective for a seat cushion. Therefore, the position of the occupant 94 is dictated by the geometry of the first side 70 of the positioning insert 68. As noted above, the generally arcuate portion 80 of the positioning insert 68 is curved upward toward a front 82 of the seat cushion 84; this helps to inhibit forward movement of the seated occupant 94. It is also curved upward toward a rear 100 of the seat cushion 84 such that it inhibits rearward movement of the seated occupant 94. Although it has been described that a positioning insert, such as the positioning insert 68, may be configured to position a seated occupant in a desired fore-aft position, it may also be configured to position a seated occupant in a desired vertical position, along the z-axis.

Figure 5:
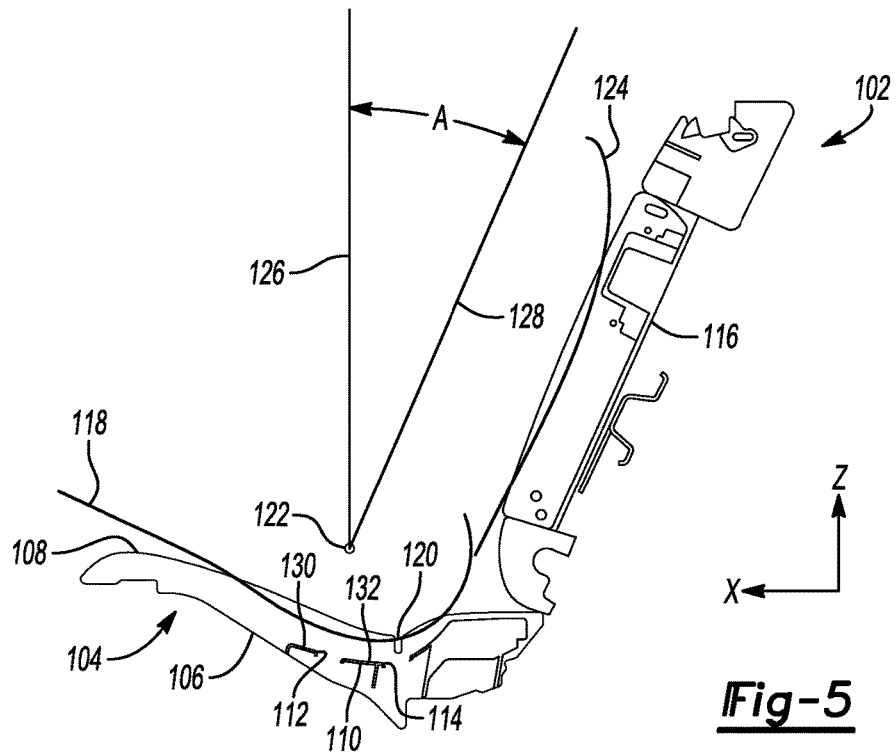
FIG. 5 shows a side-sectional view of a positioning insert installed in a seating system in accordance with embodiments of the present invention.

FIG. 5 shows a seating system 102 in accordance with embodiments of the present invention. The seating system 102 includes a seat cushion arrangement 104 including a seat cushion 106 having a seating surface 108. A positioning insert 110 is disposed below the seating surface 108, and more particularly, is molded into the foam material making up a portion of the seat cushion 106. Similar to the positioning insert 68 shown in FIG. 4, the positioning insert 110 is shown as segments in the cross-sectional view seen in FIG. 5. This is because there are apertures 112, 114 disposed through the positioning insert 110, which, as explained in more detail below, allow ingress of the foam material of the seat cushion 106 during a molding process. In addition to the seat cushion arrangement 104, the seating system 102 also includes a seat back 116 attached to the seating arrangement 104.

A contour of a seated occupant 118 is illustrated, and shows not only a buttocks 120 of the seated occupant 118 positioned by the positioning insert 110 so that the H-point 122 is in the desired location, but also shows a contour of the occupant's back 124 resting against a portion of the seat back 116. One advantage of a positioning insert, such as the positioning insert 110 and those described above, is that proper location of the H-point provides not only a desired fore-aft position, but also a desired back angle for a seated occupant. With reference to a vertical line 126, which is parallel to the z-axis, and a line 128 oriented generally parallel to the back 124 of the occupant 118, a back angle (A) for the occupant 118 is defined. In the embodiment shown in FIG. 5, a first side 130 of the positioning insert 110 defines a generally arcuate surface 132, which positions the occupant 118 in both a desired fore-aft position indicated by the H-point 122, and also provides a desired back angle (A) for the occupant 118.

Figure 6:
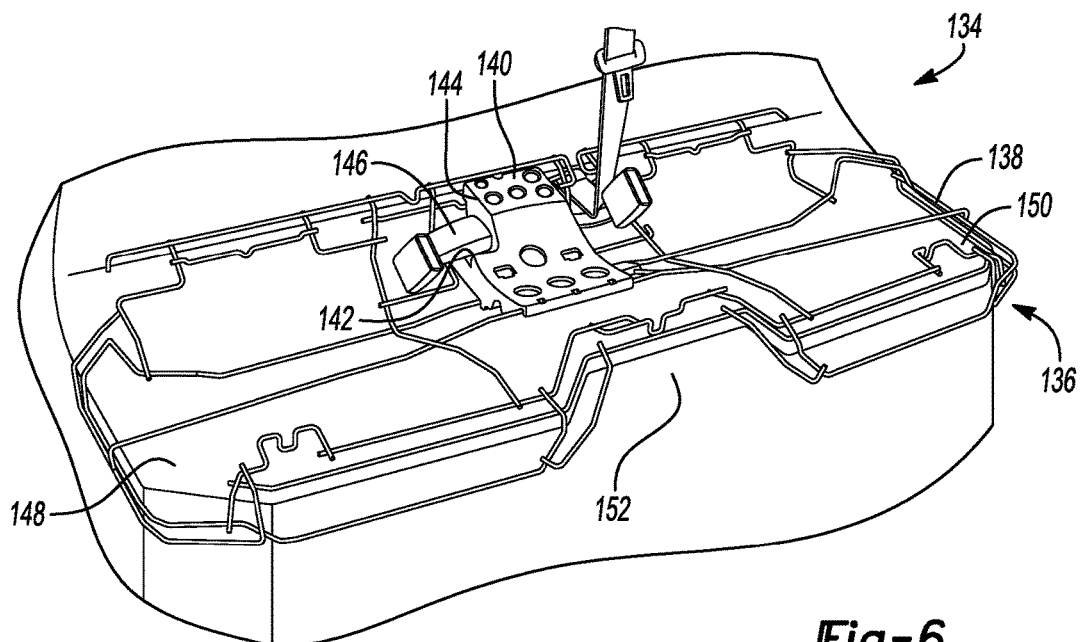
FIG. 6 shows a positioning insert in accordance with embodiments of the present invention attached to a wireframe in a seating arrangement configured to accommodate a portion of a center-seat seatbelt.

FIG. 6 shows a seating system 134 in accordance with embodiments of the present invention. A seat cushion arrangement 136 includes a wire frame 138, which is shown with the seat cushion removed to illustrate the positioning and some of the features of a positioning insert 140 in accordance with embodiments of the present invention. In addition to having some or all of the features of the other positioning insert embodiments described above, the positioning insert 140 includes a lateral portion 142, which is disposed below a back portion 144. The lateral portion 142 is configured to accommodate a portion of a seat belt arrangement 146, which forms a part of the seat cushion arrangement 136. The seat belt arrangement 146 is not attached to the positioning insert 140; rather, the lateral portion 142 of the positioning insert 140 merely allows the seat belt arrangement 146 to be positioned in its desired location.

As shown in FIG. 6, the seat cushion arrangement 136 includes left and right seats 148, 150, either of which may be a passenger-side or driver-side seat, depending on the country for which the vehicle is designed. The positioning insert 140 is provided for a center portion 152 of the seat cushion arrangement 136, and is disposed between the left and right seats 148, 150. Although positioning inserts such as illustrated and described above may be used for passenger-side and driver-side seats, they may be particularly desirable for use in a center bench seat such as illustrated in FIG. 6. This is because the center seat typically has more constraints regarding its design—for example, a driveshaft or other drivetrain components may be disposed toward the center of the vehicle, which may reduce the available depth of the center seat, thereby making positioning of a seated occupant more difficult. In these situations, a positioning insert, such as the positioning insert 140 not only facilitates proper positioning of a seated occupant, but also provides a configuration that accommodates other components that are required to fit into the relatively tight space, such as the center-seat seat belt arrangement 146 shown in FIG. 6.

Although the embodiments illustrated and described above have utilized a positioning insert for purposes of locating a seated occupant in a desired position, other embodiments of the present invention may not rely on a separate insert. More specifically, the arcuate portion of a first side of a positioning insert—e.g., the generally arcuate portion 80 of the first side 70 of the positioning insert 68 shown in FIG. 4—may be molded into the seat cushion itself without the need to use a separate positioning insert. In such embodiments, a "seat pan" may be molded from a relatively rigid polymeric material; it may then have conformal seat cushion foam assembled to it, and with a trim cover attached to an outside surface. In seating systems such as these, the general configuration of a positioning insert, such as any of the positioning inserts described and illustrated above, may be molded directly into the seat pan. Although this may add some additional cost to the seating system, it may result in a more aesthetically pleasing appearance.

Embodiments of the present invention also include a method for manufacturing a vehicle seating system, for example, such as any one of the vehicle seating systems described and illustrated above. Using the illustrations for reference, one embodiment of such a method is now described. Initially, a positioning insert, such as the positioning insert 10 illustrated in FIG. 1 may be injection molded in a simple open-shut mold. It may be made from any material effective to allow the positioning insert 10 to perform its intended functions; however, in at least some embodiments, the positioning insert 10 may be made from a polymeric material such as acrylonitrile butadiene styrene (ABS) or polypropylene (PP). As described above, and illustrated in FIG. 3, it may be convenient to mold the positioning insert 10 with attachment features such as the attachment features 38, 40, 42, 44 oriented to attach to a respective wireframe element 46 that is oriented in one direction—in this case along the y-axis—and to mold the positioning insert 10 with other attachment features such as the attachment features 48, 52 attached to a respective wireframe element 52 that is oriented in a second direction, which in this case is along the x-axis generally perpendicular to the wireframe element 46.

Although a positioning insert, such as the positioning insert 10, may be manufactured to any dimensions effective to achieve the desired results of properly positioning a seated occupant, one embodiment of the positioning insert 10 may be generally sized as follows. A width of the positioning insert 10—i.e., its linear dimension along the y-axis—may be approximately 185 millimeters (mm); this is without the y-locator 53. The y-locator may itself be approximately 44 mm as it extends outward from a lateral side of the positioning insert 10. Along the x-axis, a linear dimension of the positioning insert 10 may be approximately 281 mm, while a vertical dimension from the back portion 16 of the first side 12 to the lowest part of the second side 14 may be approximately 97 mm. Of course, these are approximate dimensions for a particular embodiment, and different embodiments may have not only different dimensions, but different ratios between the x-y-z dimensions.

The positioning insert 10 may then be attached to a wireframe, such as the wire frame 36 shown in FIG. 2. As described above, the positioning insert 10 may be attached to the wireframe 36 using only a downward, vertical motion, which facilitates fast and efficient attachment. Once a positioning insert is attached to a wireframe, a foam material may be molded over both the wireframe and the positioning insert to form a portion of a seat cushion—see, for example, the positioning insert 68 surrounded by the foam material 86 of the seat cushion 84 shown in FIG. 4, and the foam material of the seat cushion 106 molded over the positioning insert 110 shown in FIG. 5. As shown in FIG. 5, the method may include molding the foam material of the seat cushion 106 through the apertures 112, 114 of the positioning insert 110. This helps to secure the positioning insert 110 into the seat cushion 106 such that the seat cushion foam may then be the primary form of attachment between the positioning insert 110 and the rest of the seat cushion arrangement 104. Because of this, the attachment features of a positioning insert, which help to keep it temporarily secured to a wireframe, do not necessarily need to strong enough to permanently keep it in position while in use, although in at least some embodiments they may be.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seating system for a vehicle, comprising:
a seat cushion arrangement including a seat cushion having a seating surface; and
a positioning insert disposed below the seating surface of the seat cushion and having a first side oriented generally upward toward the seating surface of the seat cushion, and a second side oriented generally downward away from the seating surface of the seat cushion and including a plurality of first attachment features attached to a portion of the seat cushion arrangement, the first side including a back portion, a front portion, and a middle portion disposed between the front portion and the back portion, the middle portion being positioned lower than the front portion and the back portion such that the back portion inhibits rearward movement of a seated occupant beyond the back portion, and the front portion inhibits forward movement of a seated occupant, the positioning insert being located in the seat cushion such that it facilitates positioning of a seated occupant at a desired fore-aft position, and
wherein the seat cushion arrangement further includes a wireframe disposed below the seating surface and having a plurality of wireframe elements, the first attachment features being attached to at least one of the wireframe elements oriented in a first direction.

2. The seating system of claim 1, wherein the first side of the positioning insert defines a generally arcuate surface to position a seated occupant to provide a desired back angle for a seated occupant.

3. The seating system of claim 1, wherein the seat cushion arrangement further includes a seat belt arrangement, and the first side of the positioning insert further includes a lateral portion disposed below the back portion and configured to accommodate a portion of the seat belt arrangement.

4. The seating system of claim 1, wherein the positioning insert further includes at least one second attachment feature attached to a respective wireframe element oriented in a second direction that is different from the first direction.

5. The seating system of claim 4, wherein the first and second directions are substantially perpendicular to each other.

6. The seating system of claim 4, wherein the first and second attachment features are connectable to the wireframe by utilizing only a vertically downward movement of the positioning insert relative to the wireframe.

7. A seating system for a vehicle, comprising:
a positioning insert configured for attachment at a predetermined location to a portion of a seat cushion arrangement forming a part of the seating system such that the positioning insert facilitates positioning a seated occupant at a desired fore-aft position, the positioning insert including a first side having a generally arcuate portion configured to be oriented toward a seated occupant and to receive a seated occupant's buttocks to facilitate positioning of a seated occupant at the desired fore-aft position, and a second side disposed opposite the first side and including at least one first attachment feature to facilitate the attachment of the positioning insert to the seat cushion arrangement, and
wherein the at least one first attachment feature is configured to receive at least one respective wireframe element of a wireframe forming a part of the seat cushion arrangement.

8. The seating system of claim 7, wherein the generally arcuate portion is configured to be curved upward toward a front of the seat cushion arrangement when it is attached to the seat cushion arrangement such that it inhibits forward movement of a seated occupant, and is further configured to be curved upward toward a rear of the seat cushion arrangement when it is attached to the seat cushion arrangement such that it inhibits rearward movement of a seated occupant.

9. The seating system of claim 7, wherein the positioning insert is configured to be attached proximate a center portion of the seat cushion arrangement between a passenger-side seat and a driver-side seat.

10. The seating system of claim 9, wherein the first side of the positioning insert further includes a lateral portion configured to accommodate a portion of a center-seat seat belt arrangement forming a part of the seat cushion arrangement when the positioning insert is attached to the seat cushion arrangement.

11. The seating system of claim 7, wherein the positioning insert further includes at least one second attachment feature to further facilitate the attachment of the positioning insert to the seat cushion arrangement.

12. The seating system of claim 11, wherein the at least one first attachment feature is configured to receive a respective wireframe element oriented in a first direction, and the at least one second attachment feature is configured to receive at least one respective wireframe element of the wireframe that is oriented in a second direction different from the first direction.

13. The seating system of claim 12, wherein the first and second attachment features are connectable to the wireframe by utilizing only a vertically downward movement of the positioning insert relative to the wireframe.

14. A seating system for a vehicle, comprising:
a positioning insert configured for attachment at a predetermined location to a portion of a seat cushion arrangement forming a part of the seating system such that the positioning insert facilitates positioning a seated occupant at a desired fore-aft position, the positioning insert including:
a first side having a generally arcuate portion configured to be oriented toward a seated occupant and to receive a seated occupant's buttocks to facilitate positioning of a seated occupant at the desired fore-aft position, a second side disposed opposite the first side and including at least one first attachment feature to facilitate the attachment of the positioning insert to the seat cushion arrangement, and a lateral portion configured to accommodate a portion of a seat belt arrangement forming a part of the seat cushion arrangement when the positioning insert is attached to the seat cushion arrangement.

15. The seating system of claim 14, wherein the first side of the positioning insert defines a generally arcuate surface to position a seated occupant to provide a desired back angle for a seated occupant.

16. The seating system of claim 14, wherein the at least one first attachment feature is configured to receive at least one respective wireframe element of a wireframe forming a part of the seat cushion arrangement.

17. The seating system of claim 14, wherein the positioning insert is configured to be attached proximate a center portion of the seat cushion arrangement between a passenger-side seat and a driver-side seat.

* * * * *